(12) United States Patent  
Murphy

(10) Patent No.: US 6,272,174 B1
(45) Date of Patent: *Aug. 7, 2001

(54) MULTIPLE FREQUENCY BIN PROCESSING

(75) Inventor: John W. Murphy, Cedar Rapids, IA (US)

(73) Assignee: Rockwell Collins, Inc., Cedar Rapids, IA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,930

(22) Filed: Nov. 4, 1997

(51) Int. Cl.[7] .............................. H03K 7/30; H03K 7/40; H03K 5/159

(52) U.S. Cl. .......................... 375/235; 375/340; 375/350

(58) Field of Search ..................................... 375/347, 332, 375/377, 259, 346, 350, 316, 278, 281, 284, 285

(56) References Cited

U.S. PATENT DOCUMENTS

| | | | |
|---|---|---|---|
| 5,257,211 | * 10/1993 | Noga | 364/571.04 |
| 5,375,146 | * 12/1994 | Chalmers . | |
| 5,537,435 | * 7/1996 | Carney et al. | 375/29 |
| 5,650,785 | * 7/1997 | Rodal | 342/357 |
| 5,706,202 | * 1/1998 | Itahara et al. . | |
| 5,809,060 | * 9/1998 | Cafarella et al. | 375/206 |
| 5,841,811 | * 11/1998 | Song | 375/235 |

* cited by examiner

Primary Examiner—Chi Pham
Assistant Examiner—Jean B Corrielus
(74) Attorney, Agent, or Firm—Nathan O. Jensen; Kyle Eppele; James P. O'Shaughnessy

(57) ABSTRACT

A method for increasing signal acquisition in global positioning system receivers is described. An algorithm for a banked filter of the invention provides low attenuation between frequency bins in which all of the frequency bins produce useful results and no multiplications are required to implement the algorithm. A shortened sampling interval is provided and a banked filter process is implemented. The multiple outputs of the banked filter are detected and summed in post detection filters.

6 Claims, 4 Drawing Sheets

MULTIPLE FREQUENCY BIN PROCESSING

BACKGROUND OF THE INVENTION

The present invention generally relates to the field of radio-frequency receivers, and more particularly to a method for increasing signal acquisition in global positioning system receivers.

Conventional global positioning system (GPS) receivers integrate the baseband quadrature components, implement a power detection function, and then follow this with post detection summation. If the frequency error is large, the signal will not be acquired because of the effective bandwidth of the coherent integration process. This requires multiple searches. A solution to the problem is to shorten the sampling interval and implement a banked filter process such as a Fast Fourier transform (FFT). The multiple outputs from the FFT can then be detected and summed in post detection filters. However, the Fast Fourier transform has several disadvantages. First, if the signal frequency falls between FFT frequency bins, it will be significantly attenuated. Second, if the signal frequency is near the outer edges of the FFT response, it will be attenuated by the integration process prior to sampling. Third, the FFT requires multiplication if more than four points are used. Fourth, utilization of an FFT typically produces frequency bins with frequencies up to plus and minus one-half the interval between samples, thereby causing the frequency bins on the extremes of the pattern to be unusable because of the attenuation caused by integration over the segment period.

SUMMARY OF THE INVENTION

Accordingly, it is a goal of this invention to provide an algorithm for a banked filter for reducing the acquisition time of global positioning system (GPS) receivers. The present invention provides low attenuation between frequency bins in which all of the frequency bins produce useful results and no multiplications are required to implement the algorithm.

Slight variations to the banked filter may be utilized having varying numbers of frequency bins. For example, designs having three, four, five and ten frequency bins may be implemented.

The invention is planned for most future military GPS receivers and for the application specific integrated circuits such as an acquisition correlation engine chip. Other applications may include extended range guided munition (ERGM), MAGR, and any other GPS products.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DESCRIPTION OF THE PREFERRED EMBODIMENT

Reference will now be made in detail to the presently preferred embodiment of the invention, an example of which is illustrated in the accompanying drawings.

Figure 1:
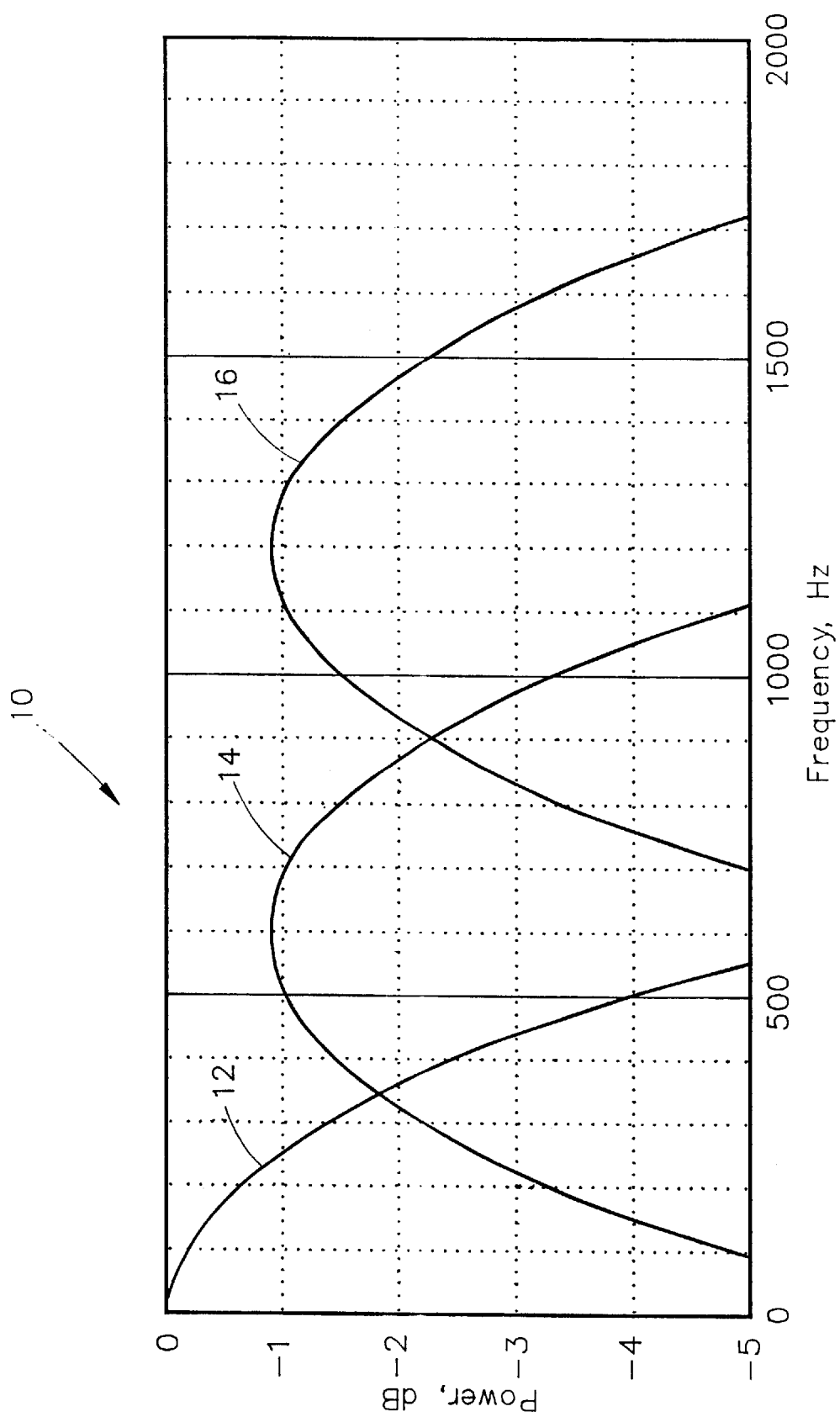
FIG. 1 is a graphical plot of a sample frequency response of the algorithm for a five segment, five frequency bin implementation of the present invention.
Figure 4:
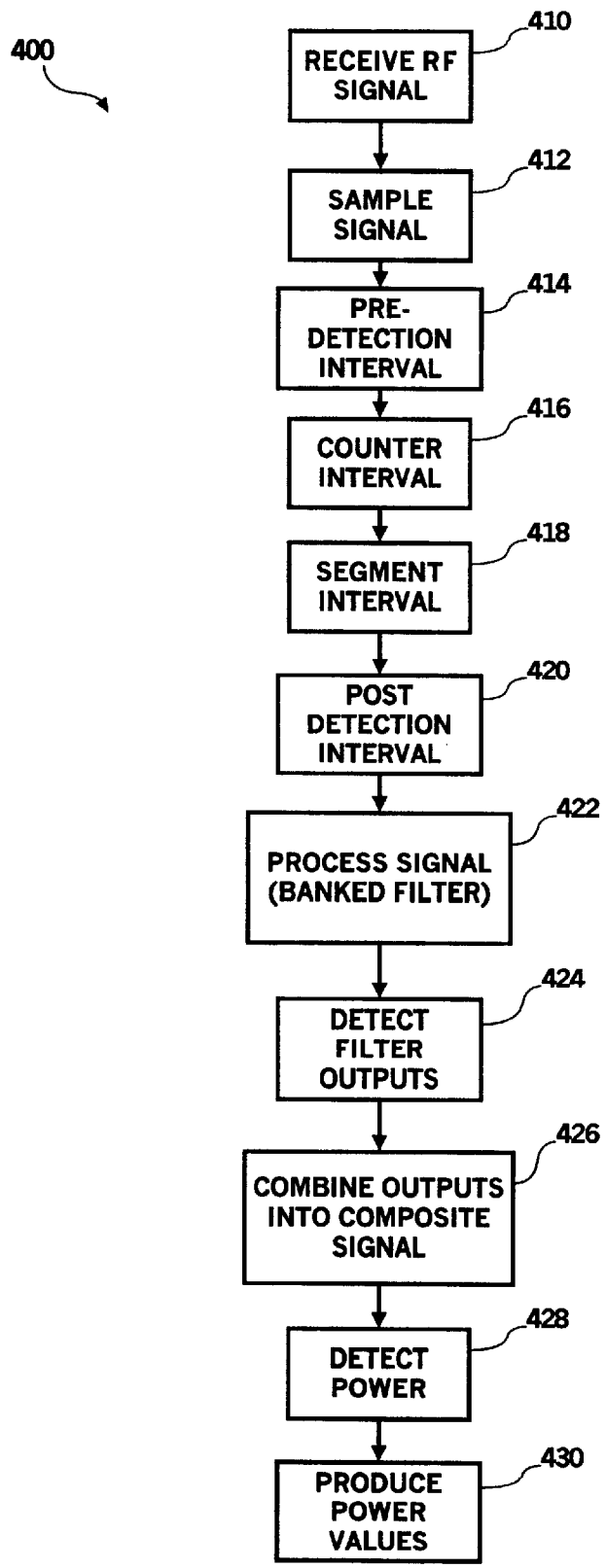
FIG. 4 is a flow diagram of a method for increasing signal acquisition in a radio-frequency receiver in accordance with the present invention.

Referring now to FIG. 1, a sample frequency response of the algorithm for a five segment, five frequency bin implementation of the present invention is shown. A flow diagram of a method for increasing signal acquisition in a radio-frequency receiver in accordance with the present invention is shown in FIG. 4. Method 400 is generally applicable to the embodiments of the invention discussed herein. However, not every step of method 400 is required to tangibly embody the invention; some embodiments may utilize fewer or more steps than are shown in FIG. 4. Method 400, in accordance with one embodiment of the present invention, comprises the steps of receiving an RF signal 410, sampling the signal 412, providing a predetection interval 414, providing a counter interval 416, providing a segment interval 418, providing a post detection interval 420, processing the signal with a banked filter 422, detecting the filter outputs 424, combining the outputs into a composite signal 426, detecting power components of the composite signal 428, and producing power values 430. Table 1 illustrates a preferred embodiment of the present invention for a five segment, five frequency bin design. FIG. 1 and Table 1 together illustrate a design having a segment length of 0.2 ms and predetection interval (PDI) of one millisecond. The illustrated design provides a frequency window of +/−1475 Hz as compared to only +/−370 Hz for a conventional design having only one frequency bin. In both cases, maximum attenuation due to frequency is 2 dB. The frequency span is inversely proportional to the predetection interval. Other segment lengths can be used to provide various frequency ranges. For example, a segment length of 4 ms and predetection interval of 20 ms provides a total range of +/−72 Hz as compared with +/−18.5 Hz for a typical conventional design.

A preferred embodiment of the present invention shown in FIGS. 1 and Table 1 implements a five segment and five frequency bin design. The advantage of multiple frequency bin designs over single bin designs is the ability to search multiple frequency windows simultaneously. In strong signal conditions, signal acquisition may be accomplished with lower accuracy frequency standards. In weak signal conditions, greater sensitivity may be realized since a longer predetection interval can be used.

The values shown in Table 1 are for a one millisecond predetection interval. The resulting composite bandwidth for a one millisecond predetection interval provides two decibels of attenuation at +/−1475 Hz and two and one-half decibels of attenuation at +/−1530 Hz. In Table 1, X and Y are the in-phase and quadrature sums, respectively, over the predetection interval for the given frequency bin, $I_N$ and $Q_N$ are the in-phase and quadrature measurements, respectively, for Nth segment, and $f_o$ is the center frequency given in hertz for a one millisecond predetection interval.

TABLE 1

Five Frequency Bins, Five Segments

| BIN | $f_O$, Hz | X | Y |
|---|---|---|---|
| -2 | -1200 | $I_1 - Q_2 - I_3 + Q_4 + I_5$ | $Q_1 + I_2 - Q_3 - I_4 + Q_5$ |
| -1 | -600 | $I_1 + I_2 - Q_3 - Q_4 - I_5$ | $Q_1 + Q_2 + I_3 + I_4 - Q_5$ |
| 0 | 0 | $I_1 + I_2 + I_3 + I_4 + I_5$ | $Q_1 + Q_2 + Q_3 + Q_4 + Q_5$ |
| 1 | 600 | $I_1 + I_2 + Q_3 + Q_4 - I_5$ | $Q_1 + Q_2 - I_3 - I_4 - Q_5$ |
| 2 | 1200 | $I_1 + Q_2 - I_3 - Q_4 + I_5$ | $Q_1 - I_2 - Q_3 + I_4 + Q_5$ |

FIG. 1 illustrates the frequency response of the algorithm presented in Table 1. The frequency response 10 is plotted only for positive frequency values since the response is symmetrical about the ordinate axis. The main lobe 12 represents the 0 Hz bin. The first sidelobe 14 represents the 600 Hz bin, and the second sidelobe 16 represents the 1200 Hz bin.

In a preferred embodiment of the present invention, there are four time intervals and five segments per predetection interval. The shortest interval is the counter interval and is preferably fixed at 0.20 ms. The counter interval is the length of time the hardware counters count before being read and reset to zero. When the counter is read, the value is transferred to RAM memory.

The next interval is the segment interval which may vary from 0.20 to 4 ms which is one-fifth of the predetection interval. During the segment interval the in-phase (I) and quadrature (Q) components of the signal are coherently summed using a pair of accumulations. The predetection interval may vary from 1.0 to 20 ms and is five times longer than the segment time. During this interval five pairs of sums are maintained, one pair for each frequency bin. Each frequency bin has a unique pattern for combining the quadrature signals in order to produce the desired frequency response.

At the end of the predetection interval, a power detector is used. Five values of detected power are produced, one for each frequency bin. The final time interval is the post detection integration interval. The post detection integration interval may vary from 5 ms to 640 ms. During this period the power detector outputs are summed.

Table 1 illustrates the algorithm for combining the signal pairs for the five segments. Only additions and subtractions of the in-phase and quadrature components are utilized without the need for performing multiplications. The algorithm of the present invention as illustrated in Table 1 produces a result similar to Fast Fourier transform (FFT). However, utilization of an FFT typically produces frequency bins with frequencies up to plus and minus one-half the interval between samples, thereby causing the frequency bins on the extremes of the pattern to be unusable because of the attenuation caused by integration over the segment period. The present invention is different from that of the typical application of FFT in which the signal is sampled instantaneously.

Other designs with various number of frequency bins ranging from three to eleven bins may be contemplated, for example. The described five bin design is preferred because it provides a good balance between maximized performance and minimized complexity.

Figure 2:
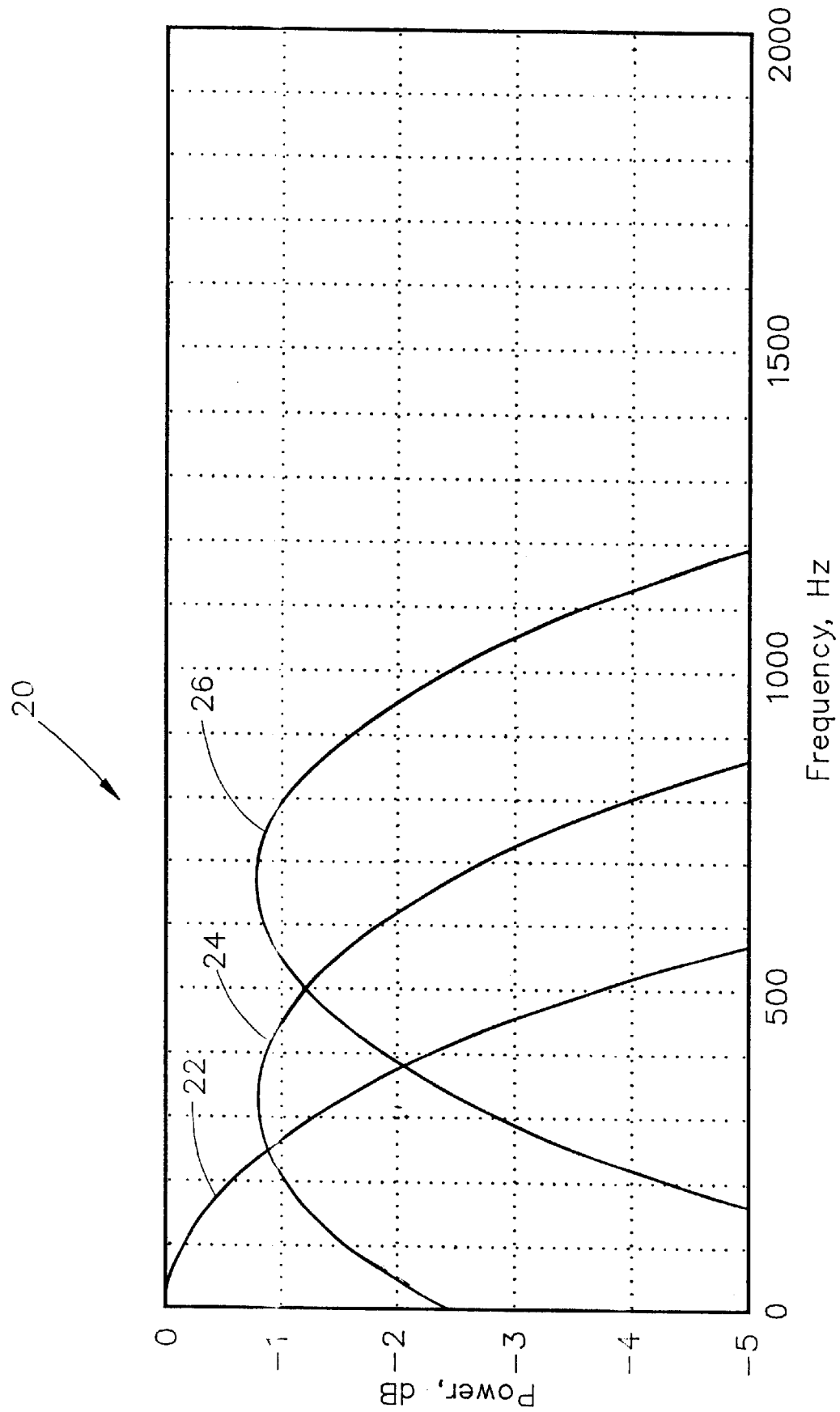
FIG. 2 is a graphical plot of a sample frequency response of the algorithm for a three segment, five frequency bin implementation in accordance with the present invention.

Referring now to FIG. 2, a sample frequency response of the algorithm for a three segment, five frequency bin implementation of the present invention is shown. Table 2 illustrates a preferred embodiment of the present invention for a three segment, five frequency bin design. FIG. 2 and Table 2 together illustrate a design having a segment length of 0.2 ms and predetection interval (PDI) of one millisecond. There are three segments per predetection interval.

The values shown in Table 2 are for a one millisecond predetection interval. The resulting composite bandwidth for a one millisecond predetection interval predetection interval provides one decibel of attenuation at 790 Hz, two decibels of attenuation at 950 Hz and two and one-half decibels of attenuation at 1000 Hz. In Table 2, X and Y are the in-phase and quadrature sums, respectively, over the predetection interval for the given frequency bin, $I_N$ and $Q_N$ are the in-phase and quadrature measurements, respectively, for Nth segment, and $f_o$ is the center frequency given in hertz for a one millisecond predetection interval.

TABLE 2

Five Frequency Bins, Three Segments

| BIN | $f_O$, Hz | X | Y |
|---|---|---|---|
| -2 | -660 | $I_1 - Q_2 - I_3$ | $Q_1 + I_2 - Q_3$ |
| -1 | -350 | $I_1 + I_2 - Q_3$ | $Q_1 + Q_2 + I_3$ |
| 0 | 0 | $I_1 + I_2 + I_3$ | $Q_1 + Q_2 + Q_3$ |
| 1 | 350 | $I_1 + I_2 + Q_3$ | $Q_1 + Q_2 - I_3$ |
| 2 | 660 | $I_1 + Q_2 - I_3$ | $Q_1 - I_2 - Q_3$ |

FIG. 2 illustrates the frequency response of the algorithm presented in Table 2. The frequency response 20 is plotted only for positive frequency values since the response is symmetrical about the ordinate axis. The main lobe 22 represents the 0 Hz bin. The first sidelobe 24 represents the 350 Hz bin, and the second sidelobe 16 represents the 660 Hz bin.

Figure 3:
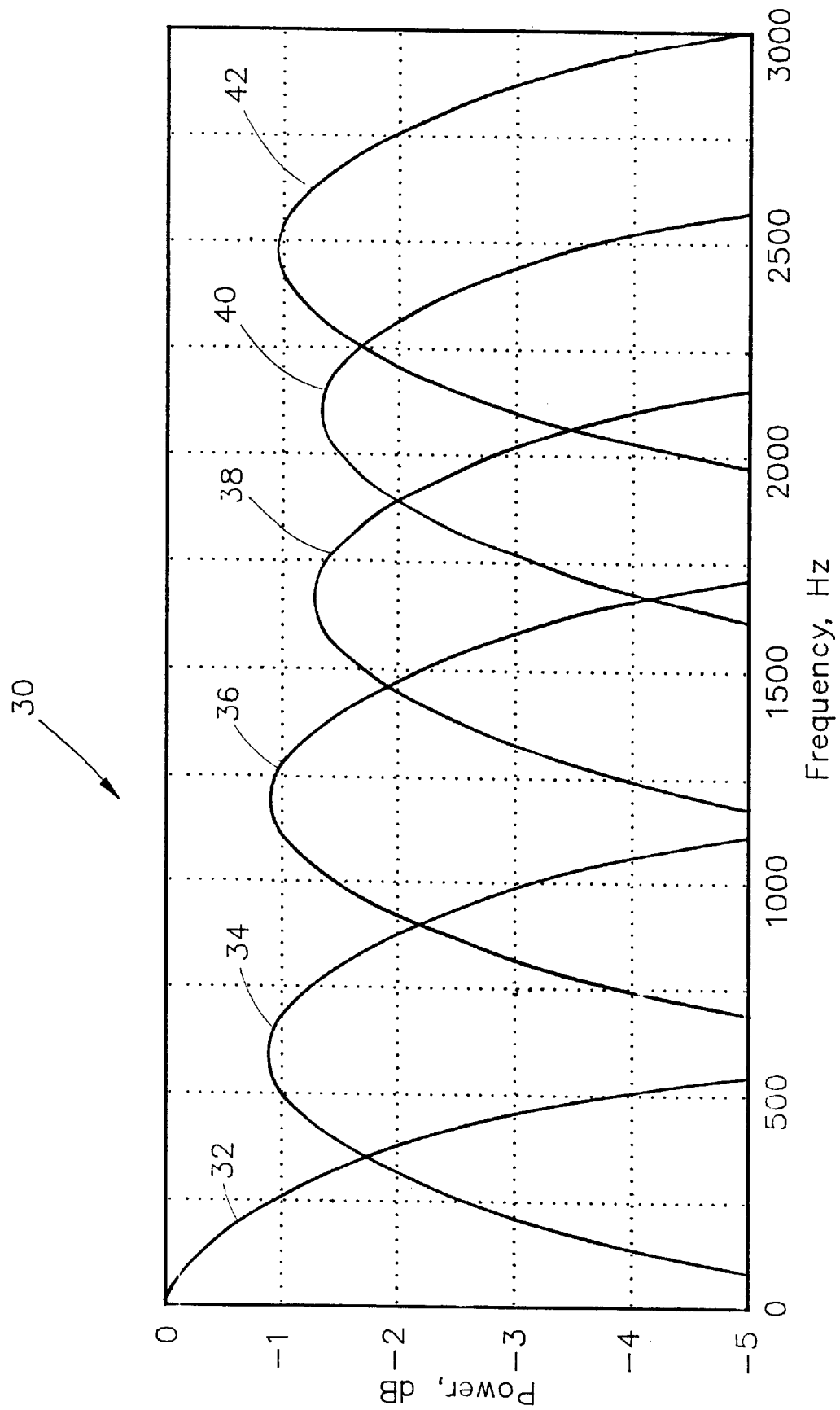
FIG. 3 is a graphical plot of a sample frequency response of the algorithm for a ten segment, eleven frequency bin implementation in accordance with the present invention.

Referring now to FIG. 3, a sample frequency response of the algorithm for a ten segment, eleven frequency bin implementation of the present invention is shown. Table 3 illustrates a preferred embodiment of the present invention for a ten segment, eleven frequency bin design. FIG. 3 and Table 3 together illustrate a design having a segment length of 0.2 ms and predetection interval (PDI) of one millisecond. There are ten segments per predetection interval.

The values shown in Table 3 are for a one millisecond predetection interval. The resulting composite bandwidth for a one millisecond predetection interval predetection interval provides two decibels of attenuation at +/-2750 Hz and two and one-half decibels of attenuation at +/-2800 Hz. In Table 3, X and Y are the in-phase and quadrature sums, respectively, over the predetection interval for the given frequency bin, $I_N$ and $Q_N$ are the in-phase and quadrature measurements, respectively, for Nth segment, and $f_o$ is the center frequency given in hertz for a one millisecond predetection interval.

TABLE 3

Eleven Frequency Bins, Ten Segments

| BIN | $f_O$, Hz | X | Y |
|---|---|---|---|
| -5 | -2450 | $I_1 - Q_2 - I_3 + Q_4 + I_5 - Q_6 - I_7 + Q_8 + I_9 - Q_{10}$ | $Q_1 + I_2 - Q_3 - I_4 + Q_5 + I_6 - Q_7 - I_8 + Q_9 + Q_{10}$ |
| -4 | -2100 | $Q_1 + I_2 - Q_3 - I_4 + Q_5 + Q_6 + I_7 - Q_8 - I_9 + Q_{10}$ | $-I_1 + Q_2 + I_3 - Q_4 - I_5 - I_6 + Q_7 + I_8 - Q_9 - I_{10}$ |
| -3 | -1700 | $I_1 + I_2 - Q_3 - I_4 - I_5 + Q_6 + I_7 + I_8 - Q_9 - I_{10}$ | $Q_1 + Q_2 + I_3 - Q_4 - Q_5 - I_6 + Q_7 + Q_8 + I_9 - Q_{10}$ |
| -2 | -1200 | $I_1 + I_2 - Q_3 - Q_4 - I_5 - I_6 + Q_7 + Q_8 + I_9 + I_{10}$ | $Q_1 + Q_2 + I_3 + I_4 - Q_5 - Q_6 - I_7 - I_8 + Q_9 + Q_{10}$ |

TABLE 3-continued

Eleven Frequency Bins, Ten Segments

| BIN | $f_O$, Hz | X | Y |
|---|---|---|---|
| −1 | −600 | $I_1 + I_2 + I_3 + I_4 − Q_5 − Q_6 + Q_7 − Q_6 − I_9 − I_{10}$ | $Q_1 + Q_2 + Q_3 + Q_4 + I_5 + I_6 + I_7 + I_8 − Q_9 − Q_{10}$ |
| 0 | 0 | $I_1 + I_2 + I_3 + I_4 + I_5 + I_6 + I_7 + I_8 + I_9 + I_{10}$ | $Q_1 + Q_2 + Q_3 + Q_4 + Q_5 + Q_6 + Q_7 + Q_8 + Q_9 + Q_{10}$ |
| 1 | 600 | $I_1 + I_2 + I_3 + I_4 + Q_5 + Q_6 + Q_7 + Q_8 − I_9 − I_{10}$ | $Q_1 + Q_2 + Q_3 + Q_4 − I_5 − I_6 − I_7 − I_8 − Q_9 − Q_{10}$ |
| 2 | 1200 | $I_1 + I_2 + Q_3 + Q_4 − I_5 − I_6 − Q_7 − Q_8 + I_9 + I_{10}$ | $Q_1 + Q_2 − I_3 − I_4 − Q_5 − Q_6 + I_7 + I_8 + Q_9 + Q_{10}$ |
| 3 | 1700 | $I_1 + I_2 + Q_3 − I_4 − I_5 − Q_6 + I_7 + I_8 + Q_9 − I_{10}$ | $Q_1 + Q_2 − I_3 − Q_4 − Q_5 + I_6 + Q_7 + Q_8 − I_9 − Q_{10}$ |
| 4 | 2100 | $−Q_1 + I_2 + Q_3 − I_4 − Q_5 − Q_6 + I_7 + Q_8 − I_9 − Q_{10}$ | $I_1 + Q_2 − I_3 − Q_4 + I_5 + I_6 + Q_7 − I_8 − Q_9 + I_{10}$ |
| 5 | 2450 | $I_1 + Q_2 − I_3 − Q_4 + I_5 + Q_6 − I_7 − Q_8 + I_9 + Q_{10}$ | $Q_1 − I_2 − Q_3 + I_4 + Q_5 − I_6 − Q_7 + I_8 + Q_9 − I_{10}$ |

FIG. 3 illustrates the frequency response of the algorithm presented in Table 3. The frequency response 30 is plotted only for positive frequency values since the response is symmetrical about the ordinate axis. The main lobe 32 represents the 0 Hz component of the signal. The first through fifth sidelobes 34, 36, 38, 40 and 42 represent the 600, 1200, 1700, 2100 and 2450 Hz bins, respectively.

It is believed that the multiple frequency bin processing of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for increasing signal acquisition in a radio frequency receiver, comprising:

receiving a continuous-time radio-frequency signal;

sampling the continuous-time radio-frequency signal at a reduced sampling interval to produce a discrete time signal, the reduced sampling interval being a predetection interval;

processing the discrete-time signal with a banked filter to produce multiple signal outputs at multiple frequency bins, wherein each of the multiple signal outputs comprises in-phase and quadrature components of the discrete-time signal;

combining the in-phase and quadrature components of at least two of the multiple signal outputs, using at least one of addition and subtraction, to produce coherent sums over the predetection interval for two or more frequency bins;

providing a post-detection interval;

detecting power of said coherent sums for said two or more frequency bins; and summing power values from the detecting step during the post detection interval, thereby producing a wide range of frequency coverage while maintaining lower attenuation of the signal between the bins such that no multiplication of the multiple signal outputs is required, summing power values from said detecting step during the post detection interval.

2. A method according to claim 1, said sampling step further comprising the step of providing a counter interval.

3. A method according to claim 1, said sampling step further comprising the step of providing a segment interval.

4. A method according to claim 3, further comprising the step of coherently summing the in-phase and quadrature components during the segment interval.

5. The method according to claim 1, wherein the in-phase and quadrature components of the multiple signal outputs are combined in a pattern of additions and subtractions without requiring multiplications.

6. A method according to claim 5, wherein the pattern of additions and subtractions is determined so that the multiple frequency bins produce a wide range of coverage while maintaining small attenuation of the signal between bins.

* * * * *